United States Patent [19]
Gender et al.

[11] Patent Number: 5,598,358
[45] Date of Patent: Jan. 28, 1997

[54] APPARATUS AND METHOD FOR CALIBRATING VEHICLE WHEEL ALIGNMENT INSTRUMENTS

[75] Inventors: James R. Gender, Kirkwood; Daniel B. January, St. Peters, both of Mo.

[73] Assignee: Hunter Engineering Company, Bridgeton, Mo.

[21] Appl. No.: 449,019

[22] Filed: May 24, 1995

[51] Int. Cl.⁶ ................................................ G01C 25/00
[52] U.S. Cl. .................................. 364/571.01; 33/203.18
[58] Field of Search ......................... 364/571.01, 424.03, 364/508, 559; 33/288, 203.18, 203.13, 203.12, 203.15, 203, 228; 29/273; 356/155, 137.09; 73/457, 462

[56] References Cited

U.S. PATENT DOCUMENTS

| | | | |
|---|---|---|---|
| Re. 33,144 | 1/1990 | Hunter et al. | 33/288 |
| 4,803,785 | 2/1989 | Reilly | 33/288 |
| 4,879,670 | 11/1989 | Colarelli, III | 364/559 |
| 5,018,853 | 5/1991 | Hechel et al. | 33/288 |
| 5,046,032 | 9/1991 | Alussick et al. | 33/288 |
| 5,519,488 | 5/1996 | Date, Jr. et al. | 356/139.09 |

*Primary Examiner*—James P. Trammell
*Attorney, Agent, or Firm*—Polster, Lieder, Woodruff & Lucchesi

[57] ABSTRACT

Apparatus and method for calibrating vehicle wheel alignment instruments includes a pan constructed of stamped and formed sheet steel, into which has been welded two cylinders. Bearings are mounted into each end of the cylinders and rotatably carry shafts onto which wheel alignment sensors are mounted during the process of calibration. The pan rests on a pair of bases with stepped cams, such that the pan can be tilted to the left or right a known amount. The pan can be flipped left to right about its longitudinal axis or end to end about its narrow (transverse) axis. A long shaft is provided which can be set into notches in the ends of the pan. A calibration procedure is performed during which the wheel alignment sensors are mounted to the various shafts, the shafts are rotated to two positions 180 degrees apart, and the pan is flipped and tilted, such that the average position occupied by the transducers of the wheel alignment sensors is as if the sensors were perfectly mounted at the four corners of a perfect rectangle. Measurements stored during this procedure are averaged to produce high quality calibration data.

20 Claims, 7 Drawing Sheets

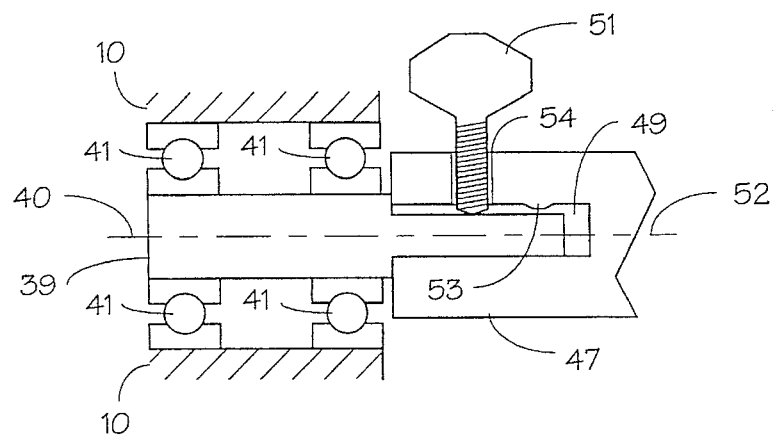
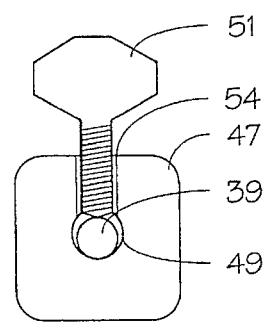
Fig. 4A
Fig. 5A
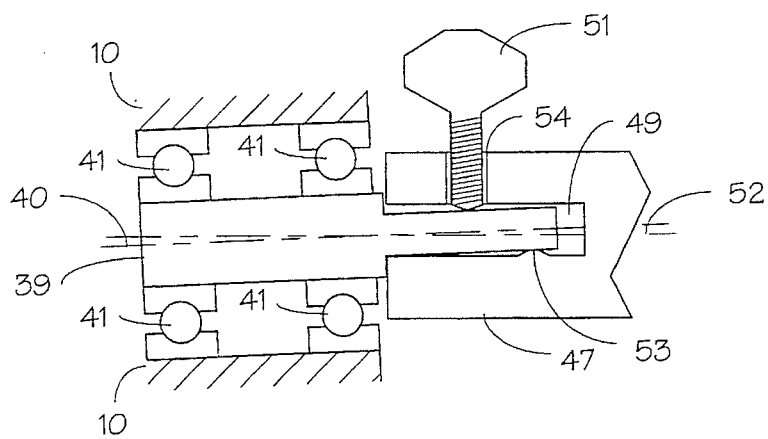
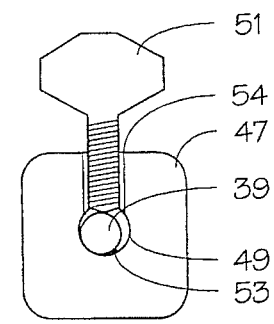
Fig. 4B
Fig. 5B
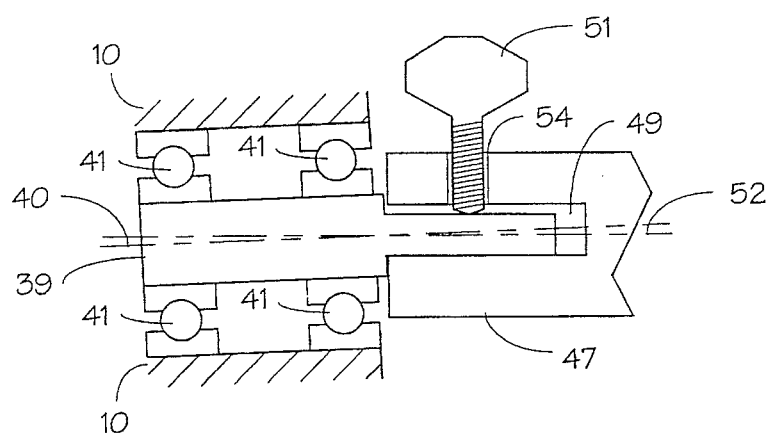
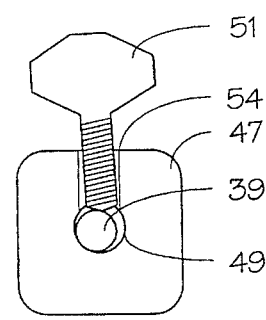
Fig. 4C
Fig. 5C

APPARATUS AND METHOD FOR CALIBRATING VEHICLE WHEEL ALIGNMENT INSTRUMENTS

BACKGROUND OF THE INVENTION

The present invention relates to vehicle wheel alignment, and more particularly to calibrating vehicle wheel alignment systems which employ electrical, electro-optical, and/or electro-mechanical transducers to measure the wheel alignment of the vehicle.

Reissued U.S. Pat. No. Re 33,144 to Hunter and January and U.S. Pat. No. 4,319,838 to Grossman and January each describe a wheel alignment system which uses electro-optical transducers to determine the toe alignment angles of a vehicle. FIG. 2 of each of these patents shows six angle transducers carried by support assemblies which are mounted to the vehicle wheels. FIG. 4 of the U.S. Pat. No. Re 33,144 patent and FIG. 9 of the U.S. Pat. No. 4,319,838 patent show the geometry of this arrangement and illustrate the six angles which are directly measured. These patents further describe (see U.S. Pat. No. Re 33,144 col. 7 lines 26–39, and U.S. Pat. No. 4,319,838 col. 8 line 63 to col. 9 line 12) how the toe alignment angles are computed from the angles directly measured by the angle transducers.

U.S. Pat. No. 4,879,670 to Colarelli (the disclosure of which is incorporated herein by reference) describes a gravity-referenced inclinometer for use in measuring wheel alignment characteristics such as camber. FIG. 1A of the U.S. Pat. No. 4,879,670 patent shows such an inclinometer carried by a support assembly which is mounted to a vehicle wheel.

Equipment of this general type has been used world-wide for many years. While the angle measurement transducers used in such systems are built using many different technologies and methods, all share the common requirement that they must be calibrated to produce accurate results. Each transducer must be "zero calibrated" in that it must be adjusted to produce a measurement which means "zero" when it is placed in a position in which the angle to be measured is defined to be "zero". Each transducer must also be "range calibrated" in that it must be adjusted to produce a change in its measurement due to a change in its angular position such that the change in measurement equals the change in the angular position.

Calibration is extremely important because the quality of alignment measurements cannot be greater than the quality of calibration of the instruments used to make those measurements. The quality of calibration is limited by the apparatus and method used to achieve the calibration. In short, a high quality wheel alignment system can be rendered useless by a low quality calibration. Although the use of a calibration fixture with an associated calibration procedure is old and widely practiced in the art, many of these fixtures and/or procedures have inherent limitations which cause them to produce inaccurate or unreliable calibrations.

Calibration can be performed in two general ways. One way is to physically adjust the mechanical and/or electrical components of the transducers, for example by changing the focus of lenses or by adjusting potentiometers. The second way is to measure the signals produced by the transducers during the calibration procedure, and then, via computer software, compute and store calibration coefficients which allow the software to compute accurate values from the transducer signals. This second way has been widely practiced for more than a decade, and is well understood in the art.

It is reasonable to expect an alignment system to be calibrated during the manufacturing process. Such systems also need to be calibrated at periodic intervals to correct the effects of general wear and tear and when components are repaired or replaced. Such "field calibrations" must be performed at the alignment work site to avoid the down time required by shipping such systems to a factory or other repair site.

SUMMARY OF THE INVENTION

Among the various objects and features of the present invention may be noted the provision of an improved apparatus and method for calibrating wheel alignment measurement instruments which overcomes the limitations of quality of calibration of previous apparatus and methods.

A second object is the provision of such an apparatus and method which is usable with many different types of alignment instruments.

A third object is the provision of such an apparatus which is inexpensive to manufacture.

A fourth object is the provision of such an apparatus which minimizes precision manufacturing operations and tight tolerances required for its construction and assembly.

A fifth object is the provision of such an apparatus which can withstand considerable abuse and wear and tear without compromising the quality of calibration.

A sixth object is the provision of such an apparatus and method which is easy to set up and use.

An seventh object is the provision of such an apparatus and method which is portable, and allows the calibration to be performed at any desired location, such as the alignment work site.

Other objects and features will be in part apparent and in part pointed out hereinafter.

Briefly, apparatus and method of the present invention is directed to zero and range calibrating the measuring instruments of a vehicle wheel alignment system.

In a first aspect of the present invention, a calibration fixture for calibrating vehicle wheel alignment instruments includes a longitudinally extending frame having a longitudinal axis, a transverse axis perpendicular to the longitudinal axis, a top, a bottom, and first and second ends. A first rotatable shaft is disposed at the first end of the frame, the first shaft having a longitudinal axis generally parallel to the transverse axis of the frame, the first shaft being mounted for rotation about its longitudinal axis and having first and second ends for removably accepting first and second sensor assemblies for calibration. A second rotatable shaft is disposed at the second end of the frame, said second shaft having a longitudinal axis generally parallel to the transverse axis of the frame, the second shaft being mounted for rotation about its longitudinal axis and having first and second ends for removably accepting third and fourth sensor assemblies for calibration. The frame is removably mounted to a base so that the top of the frame is up and the shafts are disposed to accept the first, second, third and fourth sensor assemblies. The frame is configured such that it may also be removably mounted on the mounting means with the bottom of the frame up and still be disposed to accept the sensor assemblies.

In a second aspect of the present invention, a method of calibrating vehicle wheel alignment instruments such as toe transducers includes the steps of mounting and leveling first, second, third and fourth sensor assemblies on the ends of first and second rotatable shafts disposed at first and second ends of a portable frame, recording toe measurements for said sensor assemblies, rotating the first and second shafts approximately 180°, and recording toe measurements for said sensor assemblies when the shafts are at the 180° position. The method also includes removing the sensor assemblies from the shafts and rotating the entire frame about its longitudinal axis such that the positions of the ends of each shaft are reversed. Thereafter the sensor assemblies are mounted on the shafts in the position achieved in the previous step and the toe measurements for said sensor assemblies in said position are recorded. The first and second shafts are again rotated 180°, and the resulting toe measurements for said sensor assemblies are recorded. The zero toe calibration constant for each toe transducer is obtained by averaging the corresponding four recorded toe measurements.

In a third aspect of the present invention, a method of calibrating vehicle wheel alignment instruments includes the steps of mounting first, second, third, and fourth vehicle wheel alignment instruments at the corners of a rectangle and compensating for imperfections in the rectangle by rotating mounting elements at the corners of the rectangle and by reversing predetermined adjacent corners of the rectangle.

BRIEF DESCRIPTION OF THE DRAWINGS

FIG. 4A is a cross-sectional side view showing a sensor assembly which is mounted to a calibration bar via its stub shaft and which is held in place via a thumbscrew.

FIG. 4B is a cross-sectional side view showing a sensor assembly which is mounted to a calibration bar via its stub shaft and which is held in place via a thumbscrew, the stub shaft being mislocated due to a burr or other deformity.

FIG. 4C is a cross-sectional side view showing a sensor assembly which is mounted to a calibration bar via its stub shaft and which is held in place via a thumbscrew, the stub shaft being mislocated due to its being bent.

FIG. 5A is a cross-sectional end view showing a stub shaft which is held via a thumbscrew in a circular shaped hole bored into a calibration bar.

FIG. 5B is a cross-sectional end view showing a stub shaft which is held via a thumbscrew in a circular shaped hole bored into a calibration bar, the stub shaft being mislocated due to a burr or other deformity.

FIG. 5C is a cross-sectional end view showing a stub shaft which is held via a thumbscrew in a circular shaped hole bored into a calibration bar, the stub shaft being mislocated due to a the sloppy fit of the thumbscrew in its threaded hole.

Similar reference characters indicate similar parts throughout the several views of the drawings.

DETAILED DESCRIPTION OF THE PREFERRED EMBODIMENT

Figure 1A:
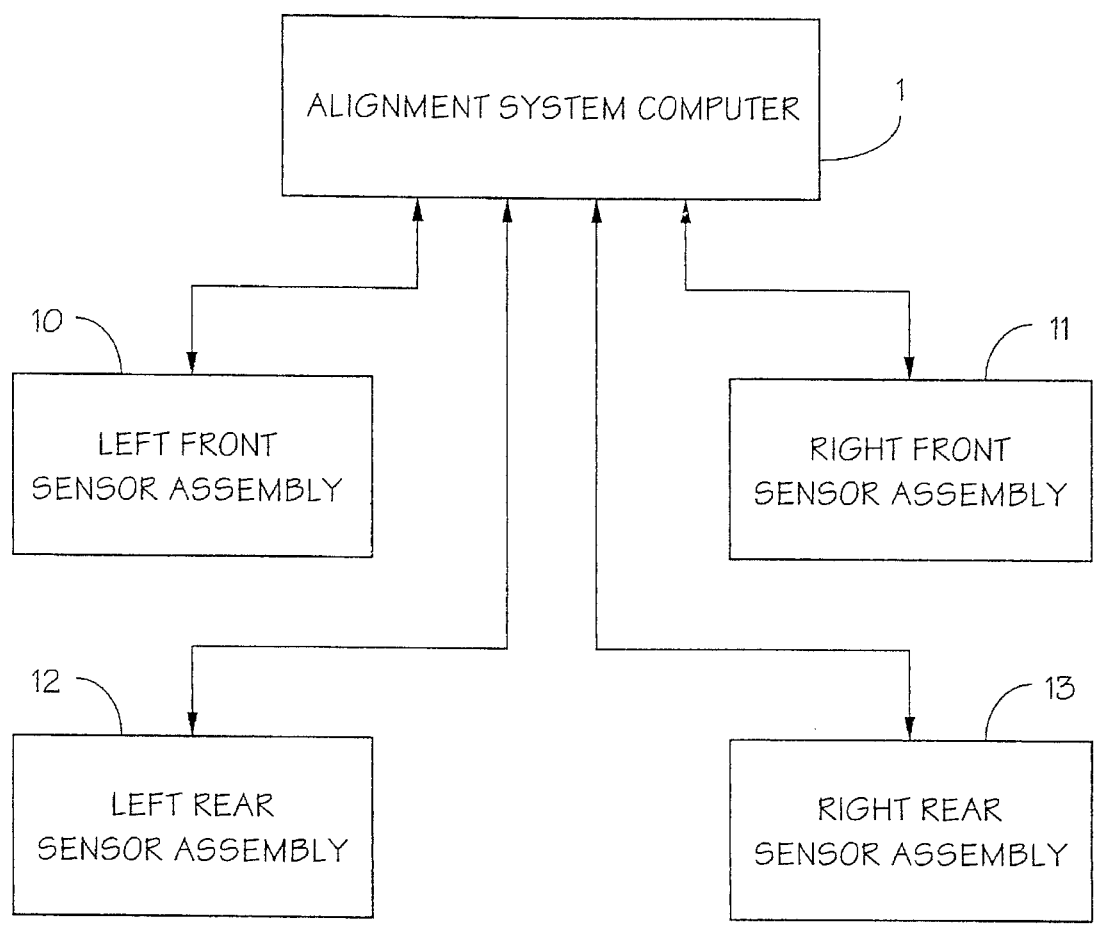
FIG. 1A is a block diagram showing four alignment sensor assemblies and an associated alignment system console.

It is preferred that the present invention be embodied in a computer controlled vehicle wheel alignment system, such as those shown in U.S. Pat. Nos. Re 33,144 to Hunter and January and 4,381,548 to Grossman and January, the disclosures of which are incorporated herein by reference. Such a system typically includes a plurality of sensor assemblies, described below, in communication with an alignment system computer 1. As shown in FIG. 1A, the sensor assemblies 10, 11, 12, and 13 are connected to the system computer via conventional communications channels, such as hardwired channels, infrared communication channels, or radio channels. Alternatively, the processing functions of the system computer may be distributed among the sensor assemblies themselves. For clarity, the system is described herein as including alignment system computer 1 which is programmed to perform the operations and computations hereinafter described. Such an arrangement is conventional and well known in the art.

Figure 1B:
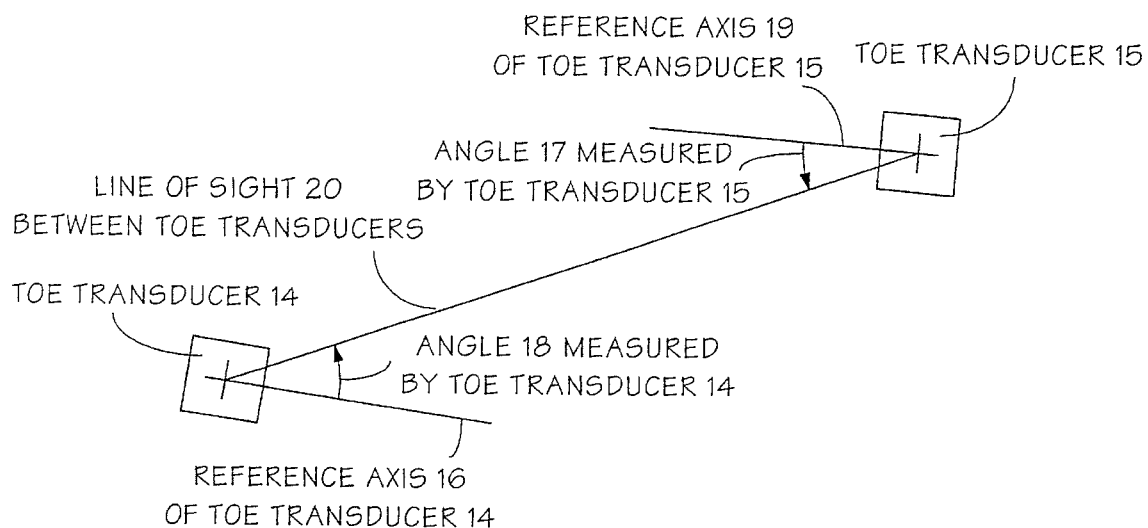
FIG. 1B is a plan view of two toe transducers which operate as a cooperative pair, showing the separate angles each measures relative to the common line of sight they share.

FIG. 1B shows a pair of toe transducers 14 and 15 which, as will become apparent, are disposed in separate sensor assemblies in communication with the alignment system computer. Toe transducer 14 and toe transducer 15 have and share a common line of sight 20 between themselves. Transducer 14 further has a reference axis 16, such that it measures the angle 18 between its reference axis 16 and the line of sight 20. Similarly, toe transducer 15 further has a reference axis 17, such that it measures the angle 19 between its reference axis 17 and the line of sight 20. Two toe transducers which share a common line of sight and operate in this general manner are termed a "cooperative pair".

Figure 1C:
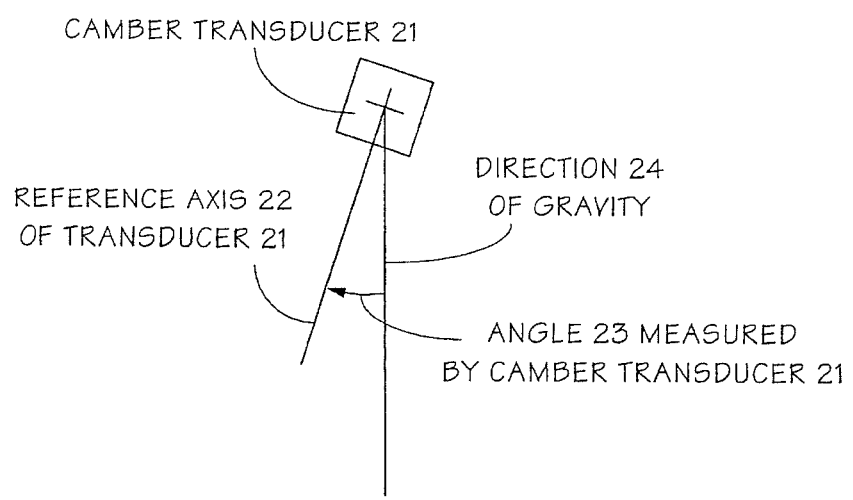
FIG. 1C is an elevation view of a camber transducer which measures an inclination angle relative to gravity.

FIG. 1C shows a single camber transducer 21 which is also disposed in a sensor assembly. Camber transducer 21 also has a reference axis 22 such that it measures the angle 23 between its reference axis 22 and the direction of gravity 24. More properly, this is known as a "camber type" transducer, as transducers of this general type are used to measure angles other than the camber of a vehicle wheel, such as caster adjust.

Figure 2A:
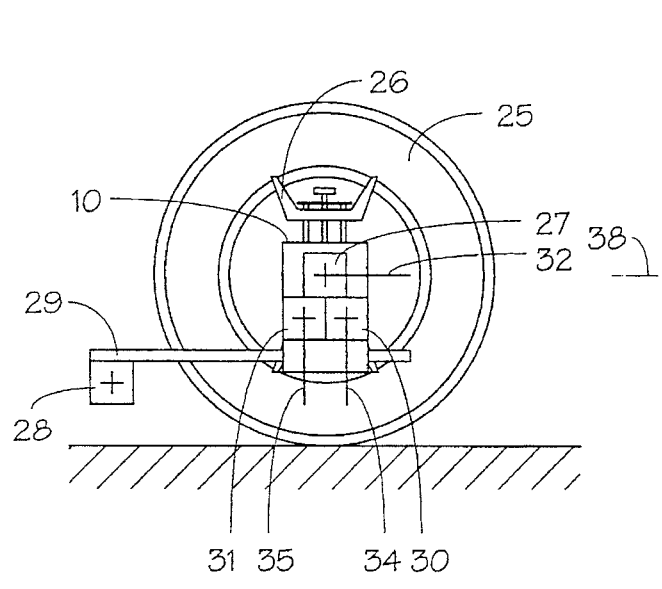
FIG. 2A is an elevation view of a single vehicle wheel on which is mounted a sensor assembly via a wheel clamp or adapter and in which are mounted various transducers.
Figure 2B:
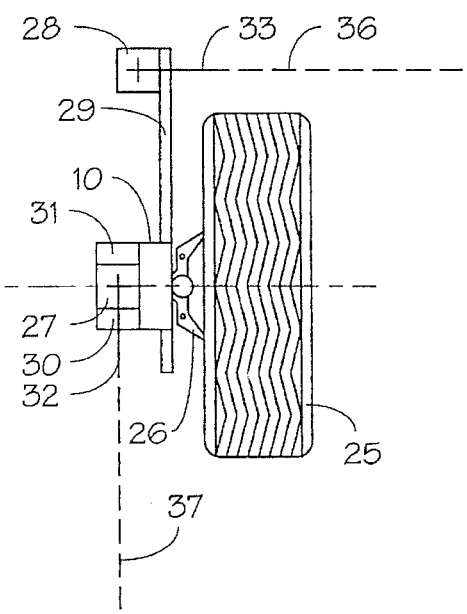
FIG. 2B is a plan view of the components shown in FIG. 2A.

FIG. 2A shows an elevation view of the left front sensor assembly 10 which is mounted to the left front vehicle wheel 25 via a wheel clamp or adapter 26. Mounted within the sensor assembly 10 is a longitudinal toe transducer 27 and a transverse toe transducer 28, which is mounted at the forward end of the toe arm 29. Further mounted within the sensor assembly 10 is a camber transducer 30 and a caster adjust transducer 31. FIG. 2B shows these same components in a plan view.

In a manner which is well known and widely practiced in the art, the longitudinal toe transducer 27 is mounted such that its reference axis 32 is generally perpendicular to the axis of rotation 38 of the wheel 25 and such that it measures an angle in a horizontal plane between its reference axis 32 and a common line of sight 37 with the corresponding longitudinal toe transducer (not shown in this view) which is similarly mounted in the left rear sensor assembly 12. The transverse toe transducer 28 is mounted such that its reference axis 33 is generally parallel to the axis of rotation 38 of the wheel 25 and such that it measures an angle in a horizontal plane between its reference axis 33 and a common line of sight 36 with the corresponding transverse toe transducer (not shown in this view) which is similarly mounted in the right front sensor assembly 11. The camber transducer 30 is mounted such that its reference axis 34 is generally perpendicular to the axis of rotation 38 of the wheel 25 in a vertical plane and such that it measures the outward or inward lean of the wheel 25 relative to gravity. The caster adjust transducer 31 is mounted such that its reference axis 35 is generally perpendicular to the axis of rotation 38 of the wheel 25 in a vertical plane and such that it measures the forward or rearward tilt of sensor assembly 10. The measurement plane of the camber transducer 30 is perpendicular to the measurement plane of the caster adjust transducer 31.

It is conventional that the right front sensor assembly 11 is a left-right mirror image of the left front sensor assembly 10. The rear sensor assemblies 12 and 13 are front-rear mirror images of the corresponding front sensor assemblies 10 and 11, further modified in that the rear sensors usually do not include transverse toe transducers 28, toe arms 29, or caster adjust transducers 31.

Figure 2C:
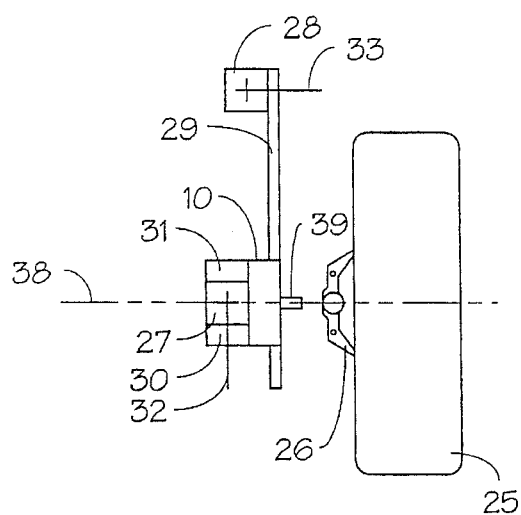
FIG. 2C is a partially exploded plan view similar to FIG. 2B, showing a stub shaft by which a sensor assembly is mounted to a wheel clamp or adapter.
Figure 2D:
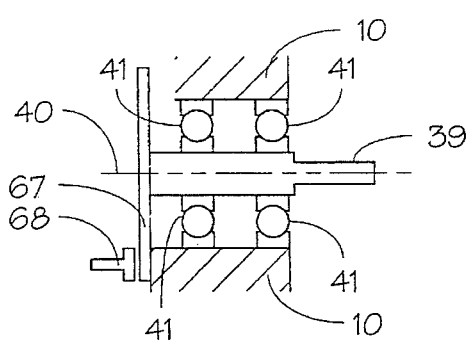
FIG. 2D is a cross-sectional view of the stub shaft by which the sensor assembly is mounted to the wheel clamp or adapter, showing the bearings by which the stub shaft is rotatably carried by the sensor.

FIG. 2C shows a plan view similar to FIG. 2B in which the left front sensor 10 has been detached from the wheel clamp or adapter 26, thereby showing the stub shaft 39 by which it is mounted to the wheel clamp or adapter 26. FIG. 2D shows a cross-section of the stub shaft 39 and the two ball bearings 41 by which it is mounted in the sensor 10. The stub shaft 39 thus has an axis of rotation 40. The bearings 10 are carefully fitted to prevent radial or axial play, thereby guaranteeing that the axis of rotation 40 of the stub shaft 39 is fixed relative to the sensor assembly 10.

When the wheel clamp or adapter 26 is clamped to the wheel 25 and the wheel 25 is rotated about its axis of rotation 38, the sensor is allowed to hang plumb and the stub shaft rotates about its own axis of rotation 40. In this way, the axis of rotation 40 of the stub shaft 39 "represents" the axis of rotation 38 of the wheel 25. The wheel alignment system actually measures the relative alignment of the axis of rotation 40 of the stub shaft 39, rather than the relative alignment of the axis of rotation 38 of the wheel 25. The deviations between the axis of rotation 40 of the stub shaft 39 and the axis of rotation 38 of the wheel 25 is termed "runout", and is compensated for by methods which are well known in the art. By compensating for this runout, the wheel alignment system is thus able to measure the relative alignments of the axis of rotation 38 of the wheel 25.

Each transducer must be "zero calibrated" in that it must be adjusted to produce a measurement which means "zero" when it is placed in a position in which the angle to be measured is defined to be "zero". The "zero position" of the camber transducer 30 is such that its reference axis 34 is perpendicular to the axis of rotation 40 of the stub shaft 39. The "zero position" of the caster adjust transducer 31 is such that its reference axis 35 is perpendicular to the axis of rotation 40 of the stub shaft 39. The "zero position" of the longitudinal toe transducer 27 is such that its reference axis 32 is perpendicular to the axis of rotation 40 of the stub shaft 39. The "zero position" of the transverse toe transducer 28 is such that its reference axis 33 is parallel to the axis of rotation 40 of the stub shaft 39. Each transducer must also be "range calibrated" in that it must be adjusted to produce a change in its measurement due to a change in its angular position such that the change in measurement equals the change in the angular position.

It is important to understand that the zero calibrations of the various transducers are defined to be relative to the axis of rotation 40 of the stub shaft 39. Calibrating the transducers can be though of as a process whereby the reference axes of the transducers are adjusted, either electronically, mathematically, or mechanically, or by a combination of these, such that they are located as described previously.

Zero calibration is generally performed by mounting the sensor assemblies 10, 11, 12, and 13 onto a calibration fixture such that the transducers measure angles which are defined to be "zero". The sensors may be mounted singly, in pairs, or all at once, and the transducers may be zero calibrated sequentially or simultaneously.

Figure 3A:
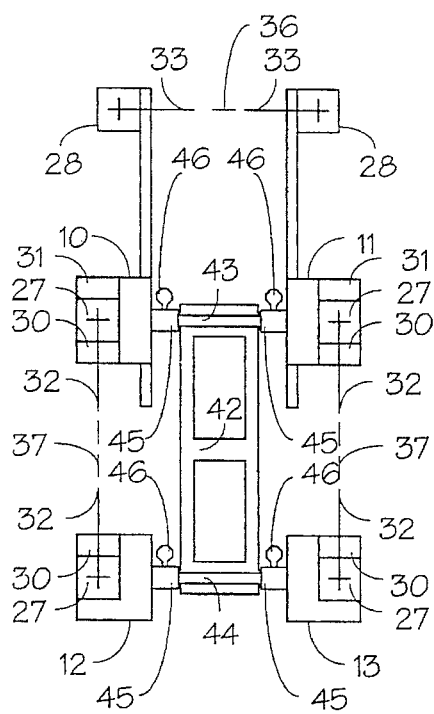
FIG. 3A is a plan view showing four sensor assemblies mounted to a rectangular prior art calibration fixture.

FIG. 3A is a plan view showing four sensor assemblies 10, 11, 12, and 13 mounted to a prior art rectangular calibration fixture. This fixture and associated calibration procedure are in common use by the assignee of the present application. The fixture consists of an aluminum casting 42 which measures approximately 22 inches long by 7 inches wide by 2 inches thick. Four V-shaped notches (not shown) are milled into the top surface such that a front shaft 43 and a rear shaft 44 rest in the notches and thereby are located and held parallel to each other in a horizontal plane. The shafts 43 and 44 are approximately ½ inch in diameter. Each end of the shafts 43 and 44 is fitted with a cylindrical end piece 45 and a thumbscrew 46, such that the stub shaft 39 of a sensor assembly is pushed into the end of the cylindrical end piece 45 and securely clamped therein by the thumbscrew 46. The shafts 43 and 44 with their end pieces 45 are approximately 12 inches in length. The inboard end surface of the left end piece 45 is held against the milled left side of the casting 42 due to the action of a wave spring (not shown) between the milled right side of the casting 42 and the inboard end surface of the right end piece 45. In this way, the outer end surfaces of the four end pieces 45 locate the sensor assemblies 10, 11, 12, and 13 along the two sides of a rectangle. The two longitudinal lines of sight 37 are thus parallel to each other.

The axes of rotation 40 of the stub shafts 39 of the sensor assemblies 10, 11, 12, and 13 are not necessarily parallel to each other, even though shafts 43 and 44 are parallel to each other, for reasons that will presently become apparent. Accordingly, simply mounting the sensor assemblies as shown in FIG. 3A is not sufficient to hold the transducers in a "zero" position for determining a zero calibration. This is overcome by storing the measurements of the toe and camber transducers, rotating the shafts 43 and 44 exactly 180 degrees, and storing the measurements again. For each toe and camber transducer, the average of the two measurements stored is what would have been measured had the axes of rotation 40 of the stub shafts 39 been parallel to each other. Since the lengths of the two shaft assemblies are the same and are held parallel to each other in a rectangular fixture, these averaged measurements are also what would have been measured had the sensor assemblies been "perfectly" mounted at the four corners of a rectangle. For the caster adjust transducers, a single measurement is sufficient, as the sensors are easily leveled in the for-aft tilt direction using an ordinary bubble level. These averaged measurements are stored in the corresponding sensor assemblies as the zero calibration coefficients for the transducers.

Although the calibration fixture and procedure shown in FIG. 3A produce very accurate zero calibrations, the fixture itself is expensive to produce. The casting 42 must be cast, then heat treated to relieve internal stresses, and finally milled to produce the appropriate mounting surfaces for the shafts and sensors. The V shaped notches in which the shafts 43 and 44 are carried must be milled such that the shafts are parallel to each other. The side surfaces outboard the V shaped notches must be milled such that the intersections of the V shaped notches and the side surfaces describe the four corners of a rectangle. Further, the entire casting 42 must be mounted to a base (not shown) such that the shafts 43 and 44 lie in a horizontal plane. High precision is required in this milling operation, which results in high costs.

To keep costs down and to allow portable operation, the fixture is kept small. The toe transducers in each pair are located approximately 20 inches apart. Normal operating distances between toe transducers in a pair are approximately 60 to 90 inches for transverse pairs and 80 to 160 inches for longitudinal pairs. Thus the toe transducers must be designed such that they operate the same at very short separation distances as at normal operating separation distances. This requires, for example, that the emitters of optical transducers be controlled such that the emitted power is reduced during calibration. This design requirement does not impair the operation or accuracy of the toe transducers, but it adds to their manufacturing costs.

Figure 3B:
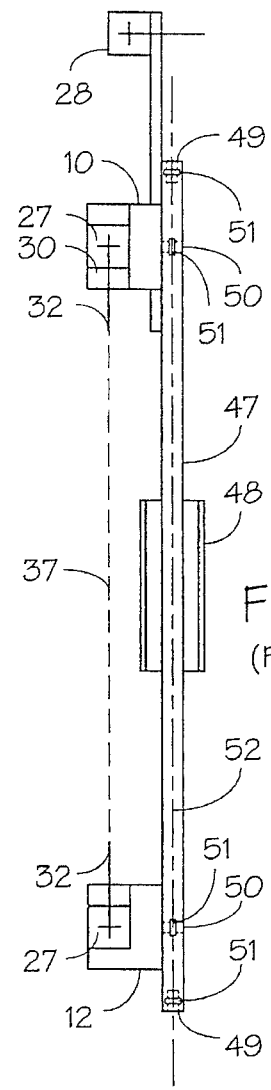
FIG. 3B is a plan view showing two sensor assemblies mounted along the sides of another prior art calibration fixture consisting of a long bar into which mounting holes have been bored, the mounting positions shown being used for zero calibrating longitudinal toe transducers.
Figure 3C:
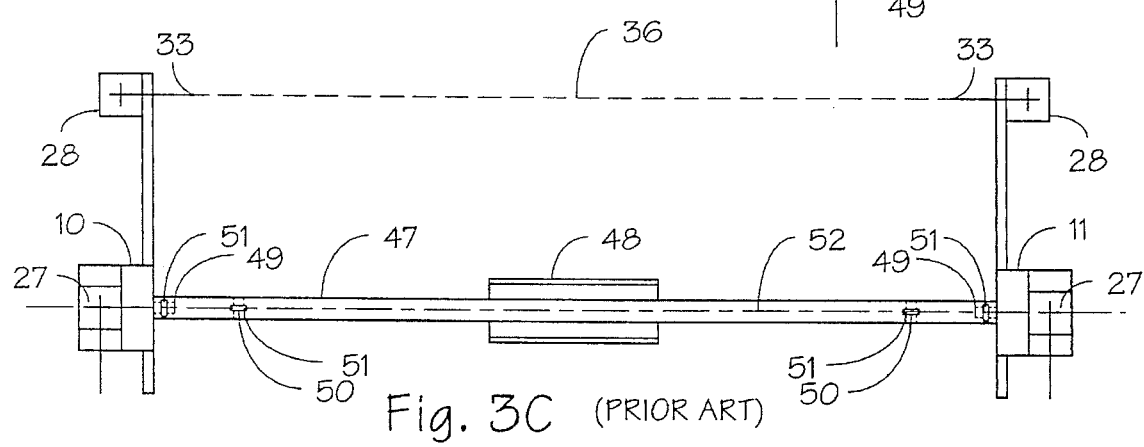
FIG. 3C is a plan view showing two sensor assemblies mounted at the ends of the calibration fixture of FIG. 3B consisting of a long bar into which mounting holes have been bored, the mounting positions shown being used for zero calibrating transverse toe transducers.

FIGS. 3B and 3C are plan views showing two sensor assemblies mounted to another type of prior art calibration fixture which is in common use. In FIG. 3B, the two left sensor assemblies 10 and 12 are mounted to zero calibrate their respective longitudinal toe transducers 27. In FIG. 3C, the two front sensor assemblies 10 and 11 are mounted to zero calibrate their respective transverse toe transducers 28. The fixture consists of a long aluminum bar 47 with a square cross-section measuring approximately 2 inches by 2 inches by 59 inches. During use, the bar rests on a U-shaped bracket 48 which is simply clamped into a bench vise. At each end of the bar, a hole 49 is bored several inches deep along the longitudinal axis 52. The hole is approximately the diameter of the stub shaft 39. Several inches from each end, a similar hole 50 is bored through the bar which is perpendicular to the longitudinal axis. Each of these four holes is fitted with a thumbscrew 51. During use, a sensor stub shaft 39 is inserted into a hole 49 or a hole 50 and is retained by the thumbscrew 51.

FIG. 3B illustrates the use of the calibration bar 47 to zero calibrate the longitudinal toe transducers 27 of the left sensor assemblies 10 and 11. First, the sensors are mounted as shown and the measurements of the toe transducers 27 are stored. Next, the sensor assemblies 10 and 11 are removed from the bar 47, the bar 47 is rotated 180 degrees about its longitudinal axis 52, and the sensor assemblies 10 and 11 are remounted to the bar 47 by inserting their respective stub shafts 39 into the opposite ends of the holes 50. Next, the measurements of the toe transducers 27 are stored again. Finally, for each toe transducer 27, the average of the two store measurements is stored in the corresponding sensor assembly as the zero calibration coefficient for the transducer. The procedure can be repeated using the right sensor assemblies 11 and 13 to zero calibrate their corresponding longitudinal toe transducers 27. A similar procedure is used as shown in FIG. 3C to zero calibrate the transverse toe transducers 28 of the front sensor assemblies 10 and 11 and, if they are present, the transverse toe transducers 28 of the rear sensor assemblies 12 and 13.

Although the calibration fixture shown in FIG. 3B and FIG. 3C is very inexpensive to produce, and embodies separation distances between toe transducers of each pair which are similar to those used on actual vehicles, the calibration quality is poor due to a fundamental flaw in the methodology. This flaw is illustrated in FIG. 4A through FIG. 4C and FIG. 5A through FIG. 5C.

FIG. 4A is a cross-sectional view showing the left front sensor 10 mounted via its stub shaft 39 to hole 49 of the calibration bar 47. The thumbscrew 51 is securely tightened to clamp the stub shaft 39 in the hole 49. In this view, the axis of rotation 40 of the stub shaft 39 is collinear with the longitudinal axis 52 of the calibration bar 47. Notice carefully that this is true in spite of the small burr or deformity 53 on the inside surface of the hold 49.

FIG. 4B is a cross-sectional view showing the same components as in FIG. 4A, except that the burr or deformity 53 in this case is on the diametrically opposite side of the hole 49. This clearly illustrates that the effect of such a burr or deformity 53 is to make the rotational axis 40 of the stub shaft 39 not be collinear with the longitudinal axis 42 of the calibration bar 47.

FIG. 4C is a cross-sectional view showing the same components as in FIG. 4A, except that in FIG. 4C the stub shaft 39 is slightly bent relative to its axis of rotation 49. This clearly illustrates that the effect of a bent stub shaft 39 is to make the rotational axis 40 of the stub shaft 39 not be collinear with the longitudinal axis 42 of the calibration bar 47.

FIG. 5A is a cross-sectional view showing the stub shaft 39 inserted into the hole 49 of the calibration bar 47 and held by the thumbscrew 51. As in FIG. 4A, the axis of rotation 40 of the stub shaft 39 is collinear with the longitudinal axis 52 of the calibration bar 47.

FIG. 5B shows how the stub shaft is mislocated by a burr or deformity 53. Note also that the mislocation can be in any combination of two axes, either up/down or left/right.

FIG. 5C shows how the stub shaft is mislocated by a sloppy fit of the thumbscrew 51 in its threaded hole 54, thereby pushing the stub shaft 39 aside. A deformed end of the thumbscrew 51 can cause the same mislocation.

The two holes 50 in calibration bar 47 ideally are bored parallel to each other and perpendicular to the longitudinal axis 52. In practice, they are not so perfectly formed. The procedure detailed above and illustrated in FIG. 3B attempts to compensate for imperfections in the holes 50 by averaging the measurements taken from each side of the bar 47. The fundamental flaw in this methodology is that the stub shaft 39 does not mate deterministically and repeatedly with the hole 50. The effects illustrated in FIG. 4B, FIG. 4C, FIG. 5B, and FIG. 5C are the cause of this, and are both unpredictable and serious. For example, the effect of a burr or deformity of 0.001 (one thousandth) inch at the end of a two inch long stub shaft is to introduce an alignment error in the axis of rotation 40 of the stub shaft 39 equal to 0.03 degrees. Such errors are assumed not to exist, but in reality they do exist, are quite large, and are intolerable.

There exists a fundamental principle which calibration apparatus and methods must embody to provide accurate calibration of sensor assemblies having captive stub shafts 39, as shown in FIG. 2C and FIG. 2D. This principle is that, because the axis of rotation 40 of the stub shaft 39 is the reference for zero calibration of the associated angle transducers, the axis of rotation 40 must be located during the calibration process by rotating the stub shaft 39. The reason is that, as shown in FIG. 4A through FIG. 4C and FIG. 5A through FIG. 5C, the surface of the stub shaft and the surface of the hole in the calibration apparatus to which it is mated are not sufficient to determine the location of the axis of rotation 40, and thus are not sufficient to orient the axis of rotation 40 as required by the procedure.

The present invention embodies this fundamental principle and thereby overcomes the limitations of the calibration fixtures and procedures shown in FIG. 3A through FIG. 3C. The invention is constructed and operated per the apparatus and procedure shown in FIG. 6A through FIG. 6G.

Figure 6A:
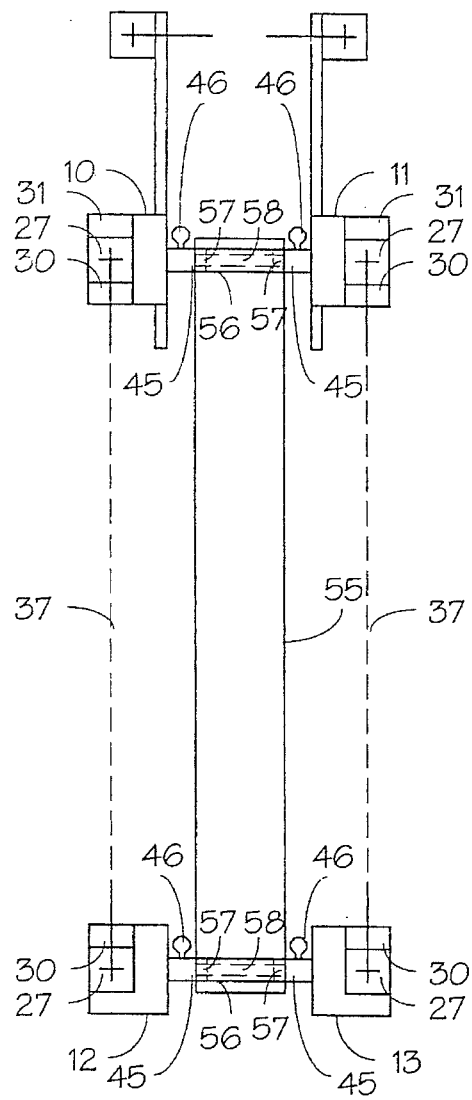
FIG. 6A is a plan view showing four sensor assemblies mounted to the ends of two shaft assemblies of an improved calibration fixture.
Figure 6B:
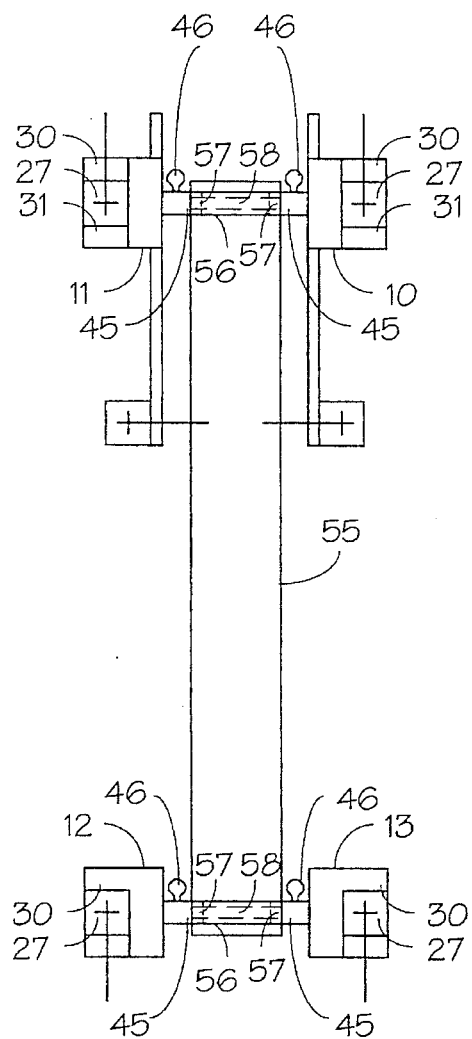
FIG. 6B is a plan view showing four sensor assemblies mounted to the ends of two shaft assemblies of an improved calibration fixture.

FIG. 6A and FIG. 6B are plan views showing sensor assemblies 10, 11, 12, and 13 mounted to a rectangular calibration fixture to calibrate their respective longitudinal toe transducers and camber transducers. A box shaped pan 55 is stamped and formed from sheet steel and measures approximately 64 inches long by 10 inches wide by 2 inches thick. The top of the box is open. Two steel cylinders 56 are welded into the pan 55, one at each end, such that their longitudinal axes are perpendicular to the sides of the pan and parallel to its bottom, as shown. Two bearings 57 are mounted into each cylinder 56, one at each end. Two steel shafts 58 are carried by the bearings 57, one at each set. Each end of the shafts 58 is fitted with a cylindrical end piece 45 and a thumbscrew 46, such that the stub shaft 39 of a sensor assembly can be pushed into the end of the cylindrical end piece 45 and securely clamped therein by the thumbscrew 46. The shafts 58 with their end pieces 45 are approximately 12 inches in length, and are constructed such that their lengths are equal. The bearings 57 are carefully fitted to prevent radial or axial play. FIG. 6B is a plan view similar to FIG. 6A except that the front sensor assemblies 10 and 11 are mounted in a reversed direction, as are the rear sensor assemblies 12 and 13.

Figure 6C:
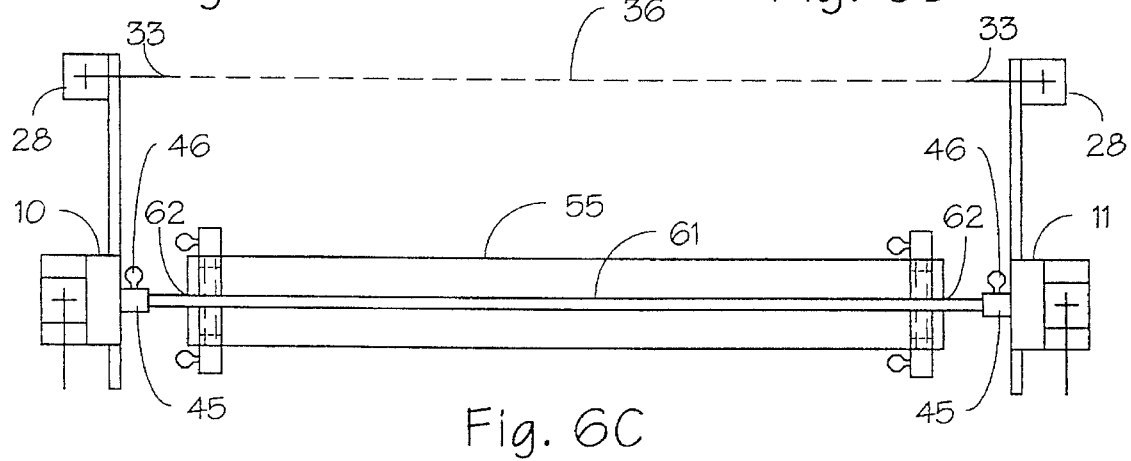
FIG. 6C is a plan view showing two sensor assemblies mounted to the ends of a long shaft assembly of an improved calibration fixture.
Figure 6D:
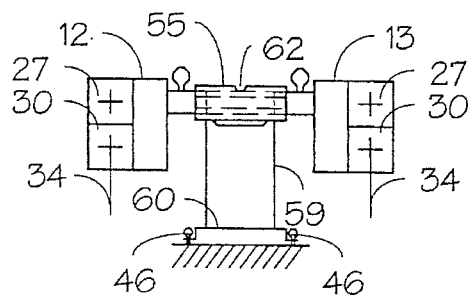
FIG. 6D is an elevation view showing the calibration fixture of FIG. 6A and FIG. 6B from the end.
Figure 6E:
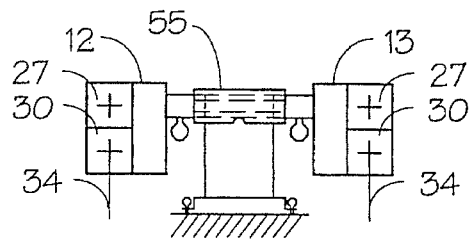
FIG. 6E is an elevation view showing the calibration fixture of FIG. 6D after the calibration fixture has been flipped left to right about its longitudinal axis.

FIG. 6D is an elevation view from the rear of the calibration fixture of FIG. 6A, showing the pan 55 resting on the top of a support 59, which is mounted to a base 60. Two supports 59 and bases 60 are used, one near each end of the pan 55. Thumbscrews 46 at the four corners of the base 60 allow the base 60 to be leveled during the calibration procedure. FIG. 6E is an elevation view as in FIG. 6D in which the pan 55 with its associated shafts 58 has been flipped left-to-right.

Figure 6F:
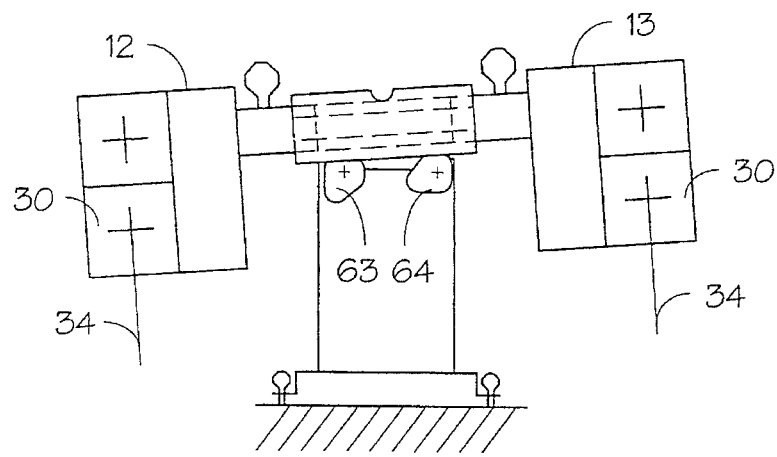
FIG. 6F is an enlarged elevation view showing the calibration fixture of FIG. 6B as it is tilted to the left via stepped cams.
Figure 6H:
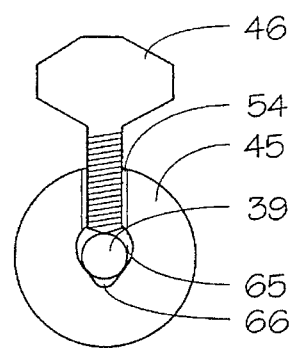
FIG. 6H is a cross-sectional view showing the mounting of a stub shaft in a V-shaped notch in the end of a calibration shaft end piece.
Figure 6G:
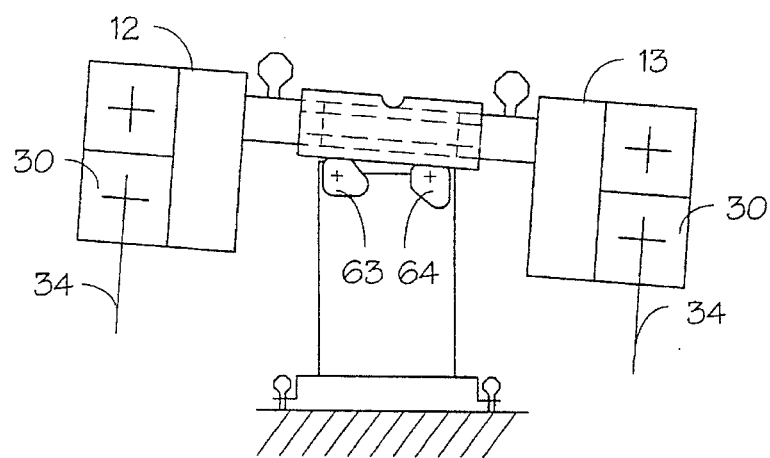
FIG. 6G is an enlarged elevation view showing the calibration fixture of FIG. 6B as it is tilted to the right via stepped cams.

FIG. 6F and FIG. 6G are elevation views as in FIG. 6D in which left stepped cams 63 and right stepped cams 64 are used to tilt the pan to the right or left, respectively, relative to the support 59. In FIG. 6F, the pan with its shaft-mounted sensor assemblies is tilted to the left two degrees while in FIG. 6G, the tilt is to the right two degrees.

The calibration procedure begins by mounting the four sensor assemblies 10, 11, 12, and 13 as shown in FIG. 6B. The pan is leveled using the thumbscrews 46 of the base 60, and the sensors are carefully leveled fore and aft using the bubble levels conventionally provided with such sensor assemblies for this purpose. As shown in FIG. 6F, the pan with its shaft-mounted sensors is tilted two degrees to the left by rotating stepped cams 64. The measurements of the camber transducers 30 are stored. Next, as shown in FIG. 6G, the pan with its shaft-mounted sensors is tilted two degrees to the right by returning stepped cams 64 to their original position and rotating stepped cams 63. The measurements of the camber transducers 30 are stored again. The camber transducers 30 have thus experienced a four degree change, and so the range calibration coefficient for each camber transducer 30 is computed and stored using the corresponding two stored measurements. The stepped cams 63 are returned to their original positions.

The calibration procedure continues by storing the measurements of the camber transducers 30 once again. The shafts 58 are then rotated 180 degrees and the measurements of the camber transducers 30 are stored once again. Next, the sensor assemblies 10, 11, 12, and 13 are removed from the shaft end pieces 45, remounted facing the directions as shown in FIG. 6A, and releveled fore and aft. The measurements of the camber transducers 30 and the longitudinal toe transducers 27 are stored. The shafts 58 are then rotated 180 degrees and the measurements of the camber transducers 30 and the longitudinal toe transducers 27 are stored once again. At this point, four measurements have been stored for each camber transducer 30 and two measurements have been stored for each longitudinal toe transducer 27. The zero calibration coefficient for each camber transducer 30 is computed and stored as the average of the corresponding four measurements.

The calibration procedure continues by dismounting the sensor assemblies 10, 11, 12, and 13 and flipping the pan 55 with its captive shafts 58 left-to-right about its longitudinal axis. The sensor assemblies 10, 11, 12, and 13 are then re-mounted as shown in FIG. 6A and releveled fore and aft. For clarity, FIG. 6D shows the assembly from the rear before flipping the pan 55 over, and FIG. 6E shows the assembly from the rear after flipping the pan 55 over. The measurements of the longitudinal toe transducers 27 are stored once again. The shafts 58 are then rotated 180 degrees and the measurements of the longitudinal toe transducers 27 are stored once again. At this point, four measurements have been stored for each longitudinal toe transducer 27. The zero calibration coefficient for each longitudinal toe transducer 27 is computed and stored as the average of the corresponding four measurements. Next, the stored measurements of each longitudinal toe transducers 27 are used to compute the corresponding range calibration coefficients, which are then stored.

The calibration procedure continues by dismounting the sensor assemblies 10, 11, 12, and 13 and remounting the front sensor assemblies 10 and 11 as shown in FIG. 6C. A long (approximately 65 inch) bar 61 with attached end pieces 45 and thumbscrews 46 is placed into semicircular notches 62 in the ends of the pan 55 after which the front sensor assemblies 10 and 11 are mounted as shown and leveled fore and aft. The measurements of the caster adjust transducers 31 are stored directly as the corresponding zero adjust coefficients. The measurements of the transverse toe transducers 28 are stored. The shaft 61 is then rotated 180 degrees and the measurements of the transverse toe transducers 27 and the caster adjust transducers 31 are stored once again. The zero calibration coefficient for each toe transverse transducer 28 is computed and stored as the average of the corresponding two measurements. Next, the stored measurements of each transverse toe transducers 28 are used to compute the corresponding range calibration coefficients, which are then stored The calibration procedure continues by rotating the stepped cams 64, thus tilting the front sensor assemblies 10 and 11 two degrees to the rear. The measurements of the caster adjust transducers 31 are stored once again. The caster adjust transducers 31 have thus experienced a two degree change, and so the range calibration coefficient for each caster adjust transducer 31 is computed and stored using the corresponding two stored measurements. If the rear sensor assemblies 12 and 13 have transverse toe transducers 28 and/or caster adjust transducers 31, the appropriate portion of the procedure may be repeated with the rear sensor assemblies 12 and 13 also at this point.

The calibration apparatus and method described above and illustrated in FIG. 6A through FIG. 6H provide very high quality calibration data, overcoming the limitations of the prior art and providing many advantages. The apparatus is inexpensive to produce, consisting primarily of stamped and formed sheet steel. It is large enough to provide toe transducer pair separation distances which approximate those experienced during normal use, yet it is small and light enough to be portable and allow operation at the customer's work site. The apparatus and method further provide both range and zero calibration data for all transducers of all sensors.

All zero calibration measurements, except for the caster adjust transducers 31, are the average of measurement pairs stored at two rotational positions of the shafts 58 and 61. (For the caster adjust transducers 31, this is not necessary.) This eliminates the need for precision machined parts to mount the stub shafts 39 collinear with the shafts 58 and 61, and further eliminates from consideration the unknown, indeterminate, non-repeatable, and serious errors caused by burrs, deformities, and other damage to the stub shafts and calibration shafts which are caused by normal use and handling. The V-shaped notch 66 in the shaft end piece 45 allows the stub shaft 39 to be securely and rigidly clamped into the end piece 45 via the thumbscrew 46 such that the average measurements are precisely determined. The shaft 58 and 61 and their corresponding end pieces 45 are thus inexpensive to produce and are quite rugged.

Flipping the pan 55 left to right while holding the shafts 58 and their end pieces 45 captive via bearings 57 without axial or radial play allows the lack of perfect parallelism between the shafts 58 to be averaged out with high precision, and thus the parallelism of the shafts 55 need not be precisely determined. These shaft assemblies are easily made to be equal in length, and thus the average mounting positions of the sensor assemblies 10, 11, 12, and 13 to the shaft end pieces 45 describes the requisite perfect rectangle. Even if the shaft assemblies are not equal in length, the procedure for zero calibrating the longitudinal toe transducers 27 is readily extended by flipping the pan 55 front to back about its narrow (transverse) axis, and then again left to right about its longitudinal axis, thereby allowing eight measurements of each toe transducers 27 to be averaged to produce the requisite perfect rectangle.

In view of the above it will be seen that the various objects and features of the invention are achieved, and other advantageous results obtained. It should be understood that the description contained herein is illustrative only and is not to be taken in a limiting sense.

What is claimed is:

1. A calibration fixture for calibrating vehicle wheel alignment instruments comprising:

a frame having a longitudinal axis, a transverse axis perpendicular to the longitudinal axis, a top, a bottom, and first and second ends;

a first rotatable shaft disposed at the first end of the frame, said first shaft having a longitudinal axis generally parallel to the transverse axis of the frame, the first shaft being mounted to the frame for rotation about its longitudinal axis and having first and second ends for removably mounting first and second sensor assemblies for calibration;

a second rotatable shaft disposed at the second end of the frame, said second shaft having a longitudinal axis generally parallel to the transverse axis of the frame, the second shaft being mounted to the frame for rotation about its longitudinal axis and having first and second ends for removably mounting third and fourth sensor assemblies for calibration;

means for mounting the frame to a base so that the top of the frame is up and the shafts are disposed to mount the first, second, third and fourth sensor assemblies;

said frame being configured such that it may also be mounted to the base with the bottom of the frame up and still be disposed to mount the sensor assemblies.

2. The calibration fixture for calibrating vehicle wheel alignment instruments as set forth in claim 1 wherein the frame is generally rectangular and has a length which is of the same order of magnitude as the length being front and rear sensor assemblies when mounted on a vehicle.

3. The calibration fixture for calibrating vehicle wheel alignment instruments as set forth in claim 1 wherein the frame is generally pan shaped.

4. The calibration fixture for calibrating vehicle wheel alignment instruments as set forth in claim 3 wherein the pan shaped frame is generally open to the top.

5. The calibration fixture for calibrating vehicle wheel alignment instruments as set forth in claim 1 wherein the frame is composed of stamped and formed sheet steel.

6. The calibration fixture for calibrating vehicle wheel alignment instruments as set forth in claim 1 wherein each shaft is mounted for rotation in its own cylinder which is fixedly mounted to the remainder of the frame.

7. The calibration fixture for calibrating vehicle wheel alignment instruments as set forth in claim 6 wherein each shaft is carried by corresponding bearings inside its cylinder.

8. The calibration fixture for calibrating vehicle wheel alignment instruments as set forth in claim 1 wherein the mounting means includes means for applying a known inclination to the frame.

9. The calibration fixture for calibrating vehicle wheel alignment instruments as set forth in claim 8 wherein the means for applying a known inclination includes at least one stepped cam rotatably mounted on the mounting means to change the inclination of the frame with respect to the mounting means.

10. The calibration fixture for calibrating vehicle wheel alignment instruments as set forth in claim 9 wherein the means for applying a known inclination includes at least one pair of stepped cams individually mounted on the mounting means such that either can be rotated to change the inclination of the frame with respect to the mounting means.

11. The calibration fixture for calibrating vehicle wheel alignment instruments as set forth in claim 1 wherein the height of the fixture when the frame is mounted with the top up is greater than the height of the fixture when the frame is mounted with the bottom up.

12. The calibration fixture for calibrating vehicle wheel alignment instruments as set forth in claim 1 wherein the shafts have openings formed in the ends thereof to receive the corresponding sensor assemblies, said openings having a generally V-shaped bottom to center the corresponding sensor assembly therein.

13. The calibration fixture for calibrating vehicle wheel alignment instruments as set forth in claim 1 further including means for leveling the base.

14. The calibration fixture for calibrating vehicle wheel alignment instruments as set forth in claim 1 further including a bar rotatably mountable to the frame in a position generally parallel to the longitudinal axis of the frame, the bar having a length generally the same as the length of the frame, said bar having first and second ends adapted to receive the first and second sensor assemblies, said frame having structure at each end adapted to receive said bar.

15. A method of calibrating vehicle wheel alignment sensor assemblies comprising the steps of:

mounting and leveling first, second, third and fourth sensor assemblies on the ends of first and second rotatable shafts disposed at first and second ends of a frame;

recording first measurements for said sensor assemblies;

rotating the first and second shafts approximately 180°;

recording second measurements for said sensor assemblies;

removing the sensor assemblies from the shafts and rotating the frame about its longitudinal axis such that the relative positions of the ends of each shaft are reversed;

mounting the sensor assemblies on the shafts in the position achieved in the previous step;

recording third measurements for said sensor assemblies;

rotating the first and second shafts approximately 180°;

recording fourth measurements for said sensor assemblies;

for each sensor assembly, averaging the corresponding first, second, third, and fourth recorded measurements to obtain a zero toe calibration constant for said sensor assembly.

16. The method of calibrating vehicle wheel alignment instruments as set forth in claim 15 wherein the sensor assemblies include camber transducers, wherein the camber transducers are range calibrated by tilting the frame in a first direction to a first position with respect to horizontal, recording camber transducer measurements while the frame is tilted in the first direction to the first position, tilting the frame a predetermined amount in a second direction to a second position, recording camber transducer measurements while the frame is tilted in the second direction to the second position, and computing a range calibration coefficient for each camber transducer from the corresponding two camber transducer measurements.

17. The method of calibrating vehicle wheel alignment instruments as set forth in claim 15 wherein the frame is received in a base, the base being adapted to receive the frame in both the original and rotated positions.

18. The method of calibrating vehicle wheel alignment instruments as set forth in claim 15 wherein the shafts are captively mounted with respect to the frame so that the four toe measurements for each sensor assembly average out both imperfections relating to the shafts and imperfections relating to the frame.

19. A method of calibrating vehicle wheel alignment instruments comprising:

mounting first, second, third, and fourth vehicle wheel alignment instruments on a frame such that the instruments are located approximately at the corners of a rectangle;

compensating for imperfections in the rectangle by removing the wheel alignment instruments, turning the frame upside down, and remounting the wheel alignment instruments.

20. The method of calibrating vehicle wheel alignment instruments as set forth in claim 19 wherein the wheel alignment instruments are mounted onto rotatable shafts and the rectangle is defined by a generally rectangular frame.

* * * * *